US000001408H

United States Statutory Invention Registration [19]

[11] Reg. Number: H1408

[43] Published: Jan. 3, 1995

Babbitt et al.

[54] MICROWAVE CIRCULATOR WITH A PLANAR, BIASING, PERMANENT MAGNET

[75] Inventors: Richard W. Babbitt, Fair Haven; Richard A. Stern, Allenwood; Ernest Potenziani, II, Ocean, all of N.J.

[73] Assignee: The United States of America as represented by the Secretary of the Army, Washington, D.C.

[21] Appl. No.: 49,192

[22] Filed: Apr. 19, 1993

[51] Int. Cl.[6] ..... H01P 1/32

[52] U.S. Cl. ..... 333/1.1

[58] Field of Search ..... 333/1.1

[56] References Cited

U.S. PATENT DOCUMENTS

| | | | |
|---|---|---|---|
| 3,085,212 | 4/1963 | Clark et al. | 333/1.1 |
| 3,101,456 | 8/1963 | Brown, Jr. et al. | 333/1.1 |
| 3,456,213 | 7/1969 | Hershenov | 333/1.1 |
| 3,710,280 | 1/1973 | Buck | 333/1.1 |

OTHER PUBLICATIONS

R. A. Stern and R. W. Babbitt, "Millimeter-Wave Microstrip 'Drop-In' Circulators" *Microwave Journal*, Apr. 1989, pp. 137–139.

*Primary Examiner*—Bernarr E. Gregory

*Attorney, Agent, or Firm*—Michael Zelenka; William H. Anderson

[57] ABSTRACT

A microstrip circuit having a plurality of coplanar microstrips mounted on a common dielectric substrate. A planar circulator is coupled to a junction of the microstrips. The circulator includes a ferrite disc which lies in the plane of the substrate. The circulator also includes a biasing permanent magnet in the form of a planar, toroidal-shaped magnet having magnetic sections that are embedded in the dielectric substrate. The magnetic sections from a split cylinder that encircles the ferrite material while permitting the microstrips to pass therethrough.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROWAVE CIRCULATOR WITH A PLANAR, BIASING, PERMANENT MAGNET

GOVERNMENT INTEREST

The invention described herein may be manufactured, used and licensed by or for the Government for governmental purposes without the payment to us of any royalties thereon.

BACKGROUND OF THE INVENTION

1. Field of the Invention

This invention relates to the field of microwave energy transmission. More particularly, the invention relates to microwave circulators for use in planar microwave transmission circuits.

2. Description of the Prior Art

A microwave circulator is a waveguide component which is used to direct the flow of microwave energy at a waveguide junction. More specifically, a microwave circulator is a multiterminal waveguide coupler in which microwave energy is transmitted in a particular direction from one terminal to the next. Such circulators employ a gyromagnetic material which phase shifts microwave energy a predetermined amount depending on its direction of propagation. Microwave circulators typically comprise a ferrite material and external biasing magnets. As is well known, the induced phase shifts for energy passing through the ferrite and, therefore, the direction of energy flow through the circulator is dependent upon the alignment of magnetic moments within the ferrite. These magnetic moments are aligned in a particular direction by the external biasing magnets.

One type of circuit which uses ferrite circulators extensively is a microstrip circuit. A microstrip is a form of waveguide which is essentially an unbalanced transmission line characterized by a planar geometry. A common form of microstrip has a rigid dielectric substrate with two parallel surfaces. A conductive ground plane is bonded to one parallel surface and a narrow flat conductor is bonded to the other parallel surface. Various types of microstrip circulators have been designed for use in coupling several microstrips to each other. A more detailed discussion of a prior art microstrip circulator appears in an article by two of the present inventors, R. A. Stern and R. W. Babbitt, entitled "Millimeter-Wave Microstrip 'Drop-In' Circulators," *Microwave Journal*, Apr. 1989, pp. 137–139.

Currently, microstrip circulators, often called planar circulators, use biasing permanent magnets which are placed outside the microstrip geometry. Although such devices have served the purpose, they have not proved entirely satisfactory because the relatively bulky biasing magnetic structures are not fully compatible with the planar technology of microstrips. As such, in many applications, the packaging densities of microstrip circuits have been severely limited by the relatively large size of the circulator biasing magnets. Those concerned with the development of electronic military systems, such as smart munitions, have long recognized the need for ways to increase the packaging densities of the electronic hardware, including microstrip circuitry, used therein. The present invention fulfills this need.

SUMMARY OF THE INVENTION

The general purpose of this invention is to provide a low-profile microstrip circulator which is more compatible with planar technology and which allows for high packaging densities. To attain this, the present invention contemplates a thin microstrip circulator having a unique planar, biasing, permanent magnet.

Broadly, the present invention is directed to a microstrip circuit comprising a conductive ground plane and a plurality of flat conductive strips mounted in a common plane parallel to the ground plane. A layer of dielectric material is located between the plane of the strips and the ground plane. A microstrip circulator is coupled to the strips and is located in the level of the layer of dielectric material.

More specifically, the invention is directed to a microstrip circuit having a plurality of coplanar microstrips mounted on a common dielectric substrate. A planar circulator is coupled to a junction of the microstrips. The circulator includes a ferrite disc which lies in the plane of the substrate. The circulator also includes a biasing permanent magnet in the form of a planar, toroidal-shaped magnet having individual magnetic sections (three or more), embedded in the dielectric substrate. The magnetic sections form a split cylinder that encircles the ferrite material while permitting the microstrips to pass therethrough.

The exact nature of this invention as well as other objects and advantages thereof will be readily apparent from consideration of the following specification relating to the annexed drawings.

DETAILED DESCRIPTION OF THE PREFERRED EMBODIMENT

Figure 1:
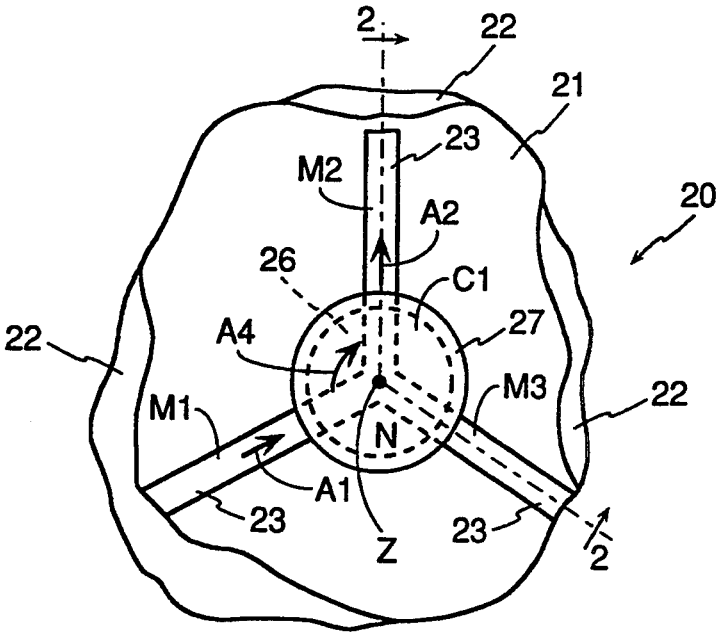
FIG. 1 (PRIOR ART)
FIG. 1 is a top plan view with parts broken away of a prior art microstrip circulator.
Figure 2:
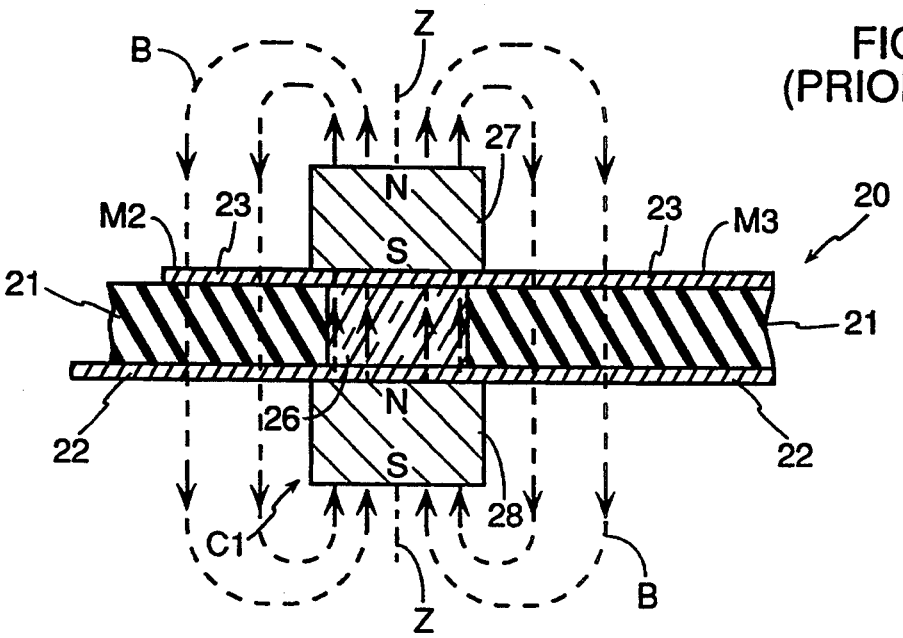
FIG. 2 (PRIOR ART)
FIG. 2 is a revolved section of the device shown in FIG. 1 taken on the line 2—2 of FIG. 1 and looking in the direction of the arrows.

Referring now to the drawings, there is shown in FIGS. 1 and 2 a prior art microstrip circuit 20 comprising a middle layer which includes a rigid dielectric substrate 21 having a circular hole in which a ferrite disc 26 is positioned. A bottom layer is made up of a conductive ground plane 22 which is bonded to the bottom surface of substrate 21 and disc 26. A top layer includes three coplanar conductive strips 23 which are bonded to the upper surface of substrate 21 and disc 26 to form microstrips M1, M2 and M3. Microstrips M1–M3 are symmetrically positioned in a Y-shaped configuration about a Z axis which passes through the center of disc 26. A pair of cylindrical bar magnets 27 and 28 are mounted coaxially with the Z axis. Magnet 27 is positioned above strips 23 and magnet 28 is positioned below ground plane 22.

Magnets 27, 28, ferrite disc 26 and that portions of the conductive ground plane 22 and strips 23 that pass therebetween form a microstrip circulator C1. Magnets 27 and 28 are commonly polarized to produce a permanent biasing magnetic field which is depicted in FIG. 2 as magnetic flux lines B that pass upwardly through ferrite disc 26 in a direction parallel to the Z axis.

As illustrated in FIG. 1, microstrip circulator C1 operates to cause microwave energy that enters it from any one of microstrips M1–M3 to be transmitted to the next microstrip in a clockwise direction as indicated by arrow A4. For example, microwave energy transmitted on microstrip M1 toward circulator C1, as indicated by arrow A1, will be directed onto microstrip M2 in the direction of arrow A2. Likewise, energy entering circulator C1 from microstrip M2 will be directed only to microstrip M3, and so forth.

The operation of circulator C1 is based on the principle that the direction of energy flow through circulator C1 is dependent upon the alignment of magnetic moments within ferrite disc 26. These magnetic moments are aligned by the external biasing magnets 27, 28 in accordance with the direction of their flux lines B. If, for example the polarity of magnets 27, 28 were reversed, the energy in circulator C1 would flow counterclockwise, i.e. in a direction opposite to arrow A4.

As noted above, biasing permanent magnets 27, 28 are located outside the general planar geometry of microstrip circuit 20. This location has not proved satisfactory in many applications. For example, the bulky profile of magnets 27, 28 can in some cases severely decrease packaging densities.

Figure 3:
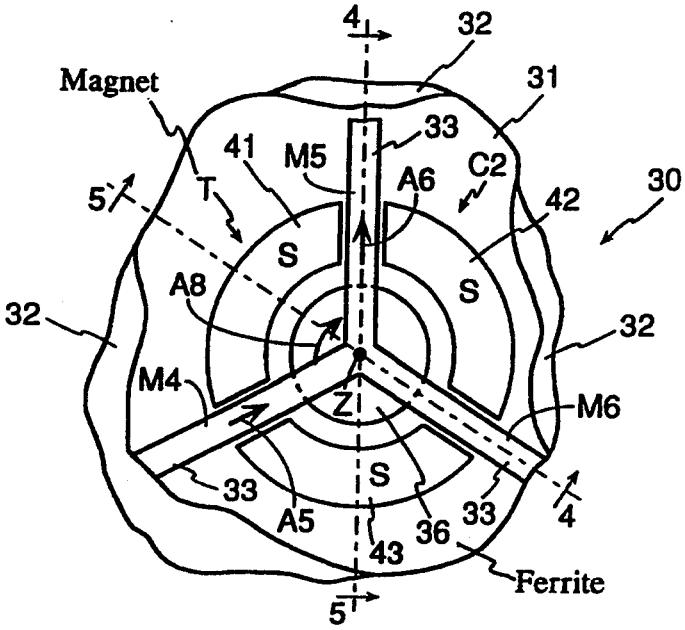
FIG. 3 is a top plan view with parts broken away of the preferred embodiment of the present invention.
Figure 4:
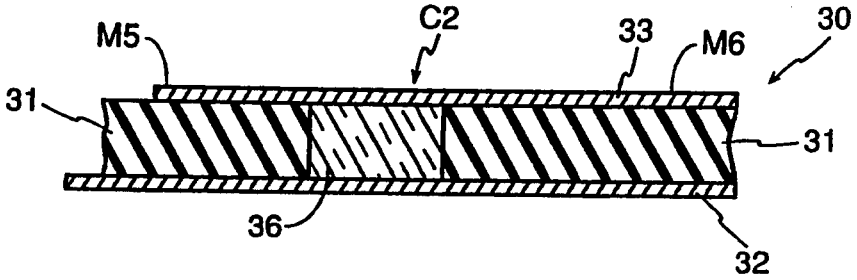
FIG. 4 is a revolved section of the preferred embodiment shown in FIG. 3 taken on the line 4—4 of FIG. 3 and looking in the direction of the arrows.
Figure 5:
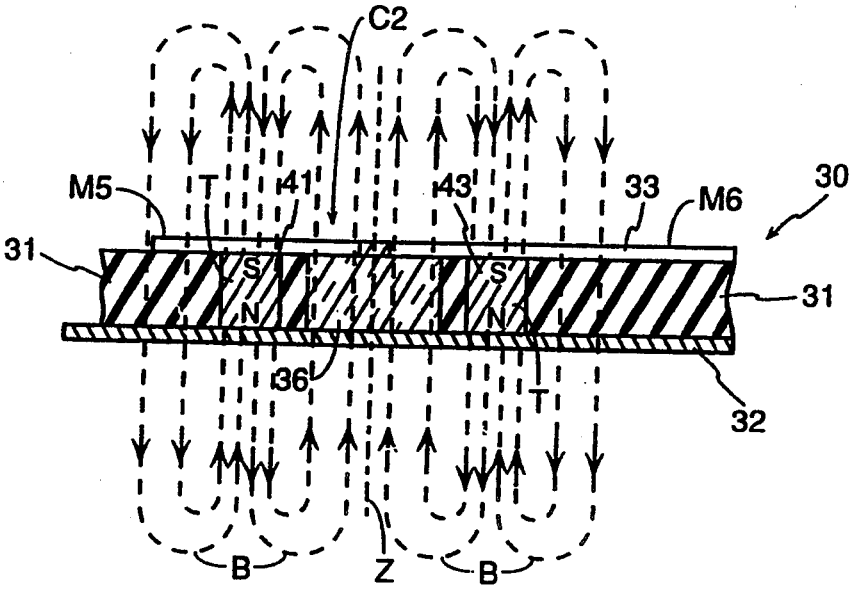
FIG. 5. is a revolved section of the preferred embodiment shown in FIG. 3 taken on the line 5—5 of FIG. 3 and looking in the direction of the arrows.

FIGS. 3–5 illustrate a microstrip circuit 30 which is made in accordance with the present invention. Microstrip circuit 20 has a middle layer composed of a rigid dielectric substrate 31 with a circular hole in which a ferrite disc 36 is positioned and three curved slots in which a toroidal-shaped magnet T is located. A bottom layer is formed from a conductive ground plane 32 which is bonded to the bottom surfaces of substrate 31, disc 36 and magnet T. A top layer includes three coplanar conductive strips 33 which are bonded to the upper surface of substrate 31 and disc 36 to form microstrips M4, M5,and M6. Microstrips M4–M6 are symmetrically positioned in a Y-shaped configuration about the Z azis (see FIG. 5) which passes through the center of disc 36. Magnet T, ferrite disc 36 and the intersecting portions of microstrips M4–M6 form a circulator C2.

Toroidal-shaped magnet T is made up of three magnetic sections 41, 42 and 43 which have a height equal to that of substrate 31. The combination of magnetic sections 41–43 form the general outline of a hollow cylinder (toroid) which is spaced from and coaxially positioned about the periphery of ferrite disc 36. More precisely, magnetic sections 41–43 form a split cylinder having three vertical slots which accommodate the passage of microstrips M4–M6. Because most magnetic materials are conductors, conductive strips 33 do not normally contact section 41–43. If such contact is made, the conducting circuit may be shorted to ground or to adjacent microstrips. Also in this regard, since the electromagnetic energy in microstrips M4–M6 is located in the dielectric substrate 31 between strips 33 and ground plane 32, magnetic sections 41–43, if made of conductive material, must not extend into that region and block such propagation. As stated above, sections 41–43 should preferably form slots through which microstrips M4–M6 pass.

Magnet T is vertically polarized with its north pole facing downwardly such that its magnetic flux lines B pass upwardly through ferrite disc 36 parallel to the Z axis. Because flux lines B in circulators C1 and C2 are similarly oriented, circulator C2 operates in a manner similar to that of circulator C1. Specifically, microstrip circulator C2 operates to cause microwave energy that enters ferrite disc 36 from any one of the microstrips M4–M6 to be transmitted to the next microstrip in the clockwise direction as indicated by arrow A8. For example, microwave energy transmitted by microstrip M4 toward circulator C2, as indicated by arrow A5, is directed by circulator C2 onto microstrip M5 which will transmit that energy in the direction of arrow A6. Likewise, energy entering circulator C2 from microstrip M5 will be directed only to microstrip M6, and so forth.

Like circulator C1, the magnetic moments of ferrite disc 36 are aligned by biasing magnet T in accordance with the direction of the flux lines B that pass through ferrite disc 36. However, unlike circulator C1, magnetic sections 41–43 which make up magnet T are located within the planar geometry of microstrip circuit 30. As such, they will have no effect on the packaging density of microstrip circuit 30.

It should be understood, of course, that the foregoing disclosure relates to only a preferred embodiment of the invention and that numerous other modifications of alterations may be made therein without departing from the spirit and the scope of the invention as set forth in the appended claims.

What is claimed is:

1. A microstrip circuit a conductive ground plane;

a dielectric substrate mounted on the conductive ground plane a plurality of flat conductive microstrips mounted in a common plane on the dielectric substrate;

a region of ferrite material displaced within the dielectric substrate beneath a portion of each of said conductive microstrips; and a biasing permanent magnet positioned within the dielectric substrate such that the permanent magnet encircles the region of ferrite material.

2. The circuit of claim 1 wherein the biasing magnet includes a plurality of magnetic sections positioned in a toroidal-shape region encircling the region of ferrite material.

3. The circuit of claim 2 wherein the region of ferrite material is a ferrite disc.

4. The circuit of claim 3 wherein said magnetic sections form a split cylinder having a plurality of slots and wherein each of said strips is located in the plane of a different one of said slots.

* * * * *